(12) United States Patent
Hart et al.

(10) Patent No.: US 11,554,517 B2
(45) Date of Patent: *Jan. 17, 2023

(54) TILE SAW

(71) Applicant: TTI (MACAO COMMERCIAL OFFSHORE) LIMITED, Macau (MO)

(72) Inventors: Michael R. Hart, Anderson, SC (US); David E. Dutterer, Belton, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 998 days.

This patent is subject to a terminal disclaimer.

(21) Appl. No.: 16/284,734

(22) Filed: Feb. 25, 2019

(65) Prior Publication Data

US 2019/0184604 A1 Jun. 20, 2019

Related U.S. Application Data

(63) Continuation of application No. 15/487,840, filed on Apr. 14, 2017, now Pat. No. 10,252,444.

(51) Int. Cl.
| | |
|---|---|
| *B28D 7/02* | (2006.01) |
| *B28D 1/04* | (2006.01) |
| *B23D 45/06* | (2006.01) |
| *B23D 47/04* | (2006.01) |

(52) U.S. Cl.
CPC ............ *B28D 7/02* (2013.01); *B23D 45/06* (2013.01); *B28D 1/04* (2013.01); *B23D 47/045* (2013.01)

(58) Field of Classification Search
CPC .......... B23D 47/02; B23D 45/06; B28D 1/04; B28D 7/02
See application file for complete search history.

(56) References Cited

U.S. PATENT DOCUMENTS

| | | | | |
|---|---|---|---|---|
| 1,750,737 | A | * 3/1930 | Walter | ............. B24B 27/06 125/13.01 |
| 1,824,000 | A | 9/1931 | Walter | |
| 2,204,190 | A | 6/1940 | Siegel | |
| 2,444,598 | A | * 7/1948 | Eyles | ............. B28D 1/047 29/DIG. 72 |
| 3,069,950 | A | 12/1962 | Hensley | |

(Continued)

FOREIGN PATENT DOCUMENTS

| | | |
|---|---|---|
| CN | 200948649 Y | 9/2007 |
| CN | 103963169 A | 8/2014 |

(Continued)

*Primary Examiner* — Joseph J Hail
*Assistant Examiner* — J Stephen Taylor
(74) *Attorney, Agent, or Firm* — Michael Best & Friedrich LLP

(57) ABSTRACT

A tile saw includes a saw unit having a motor and a saw blade driven by the motor, a table through which the saw blade at least partially protrudes, and a pan positioned underneath the table and including a channel configured to receive at least a portion of the saw blade. The channel extends along a longitudinal axis perpendicular to a rotational axis of the saw blade such that fluid moves through the channel in a first direction in response to rotation of the saw blade. An interior wall is positioned adjacent the channel. The interior wall is obliquely oriented relative to the longitudinal axis of the channel to redirect the fluid in a second direction that is different from the first direction.

20 Claims, 5 Drawing Sheets

(56) References Cited

U.S. PATENT DOCUMENTS

| | | |
|---|---|---|
| 4,026,174 A | 5/1977 | Fierro |
| 4,080,952 A | 3/1978 | Wain |
| 4,281,570 A | 8/1981 | Hill |
| 4,541,404 A | 9/1985 | Dols |
| 4,558,618 A | 12/1985 | Bachmann et al. |
| 4,587,875 A | 5/1986 | Deley |
| 4,779,603 A | 10/1988 | Crocetti |
| 4,860,723 A | 8/1989 | Fortin |
| 4,976,251 A | 12/1990 | Smith |
| 4,991,354 A | 2/1991 | Schweickhardt |
| RE35,666 E | 11/1997 | Smith |
| 6,062,121 A | 5/2000 | Ceroll et al. |
| 6,283,110 B1 | 9/2001 | Lee |
| 6,439,218 B1 | 8/2002 | Hulett |
| 6,672,188 B2 | 1/2004 | Lee |
| 6,672,348 B2 | 1/2004 | Ransom et al. |
| 6,675,685 B2 | 1/2004 | Ceroll et al. |
| 6,745,803 B2 | 6/2004 | Sanfilippo |
| 6,796,890 B1 | 9/2004 | Goldrick |
| 6,880,543 B2 | 4/2005 | Bradfield |
| 6,899,004 B1 | 5/2005 | Miller |
| 6,932,073 B2 | 8/2005 | Zhang |
| 7,036,414 B2 | 5/2006 | Behne et al. |
| 7,234,380 B2 | 6/2007 | Garcia |
| 7,263,922 B2 | 9/2007 | Hewitt et al. |
| 7,594,459 B2 | 9/2009 | Miller et al. |
| 7,819,111 B2 | 10/2010 | Wise |
| 8,122,802 B2 | 2/2012 | Lacy |
| 8,347,871 B2 | 1/2013 | Irvine |
| 8,424,434 B2 | 4/2013 | Koegel et al. |
| 8,607,775 B2 | 12/2013 | Cao et al. |
| 8,616,104 B2 | 12/2013 | Frolov et al. |
| 9,120,241 B2 | 9/2015 | Holladay |
| 9,168,674 B2 | 10/2015 | Walker et al. |
| 2002/0174860 A1 | 11/2002 | Cullen |
| 2004/0134324 A1 | 7/2004 | Sheddy et al. |
| 2005/0051015 A1 | 3/2005 | Zhang |
| 2006/0201297 A1 | 9/2006 | Friend |
| 2006/0218803 A1 | 10/2006 | Zhang |
| 2007/0204733 A1 | 9/2007 | Garcia |
| 2009/0266350 A1* | 10/2009 | Zhang .............. B28D 7/02 125/35 |
| 2012/0118278 A1 | 5/2012 | La Banco et al. |
| 2012/0186410 A1 | 7/2012 | Lacy |
| 2013/0055865 A1 | 3/2013 | Sheddy et al. |
| 2014/0216224 A1 | 8/2014 | Bernhardt et al. |
| 2014/0261367 A1 | 9/2014 | Ipatenco et al. |
| 2015/0367530 A1 | 12/2015 | Vikholm et al. |
| 2016/0082531 A1 | 3/2016 | Walker et al. |

FOREIGN PATENT DOCUMENTS

| | | |
|---|---|---|
| CN | 104275749 A | 1/2015 |
| EP | 1057564 | 12/2000 |
| EP | 2915643 | 9/2015 |
| WO | 2010107937 | 9/2010 |

* cited by examiner

TILE SAW

CROSS-REFERENCE TO RELATED APPLICATIONS

This application is a continuation of U.S. patent application Ser. No. 15/487,840 filed Apr. 14, 2017, the entire contents of which are incorporated by reference herein.

FIELD OF THE INVENTION

The present invention relates to tile saws, and more specifically to cooling systems for tile saws.

BACKGROUND OF THE INVENTION

Conventional tile saws include a rotating saw blade that is capable of cutting through tile. During cutting, the saw blade can become overheated. Therefore, a cooling fluid is often used to cool the saw blade while the saw blade is cutting the tile. The cooling fluid can be held in a pan positioned below a table. In this configuration, the saw blade extends into the pan and rotates through the cooling fluid in the pan as it cuts. Cooling fluid can also be sprayed directly onto the saw blade. In this configuration, the cooling fluid is contained by a shield partially surrounding the saw blade.

SUMMARY OF THE INVENTION

In one aspect, the invention provides a tile saw including a saw unit having a motor and a saw blade driven by the motor, a table through which the saw blade at least partially protrudes, and a pan positioned underneath the table and including a channel configured to receive at least a portion of the saw blade. The channel extends along a longitudinal axis perpendicular to a rotational axis of the saw blade such that fluid moves through the channel in a first direction in response to rotation of the saw blade. An interior wall is positioned adjacent the channel, where the interior wall is obliquely oriented relative to the longitudinal axis of the channel to redirect the fluid in a second direction that is different from the first direction.

In another aspect, the invention provides a tile saw including a saw unit having a motor and a saw blade driven by the motor, a table through which the saw blade at least partially protrudes, and a pan positioned underneath the table and including an interior cavity configured to hold a fluid. A first interior wall extends perpendicular to a rotational axis of the blade, where the first interior wall at least partially defines a channel configured to receive at least a portion of the saw blade. A second interior wall extends from an end of the first interior wall, where the second interior wall is obliquely oriented relative to the rotational axis of the blade.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
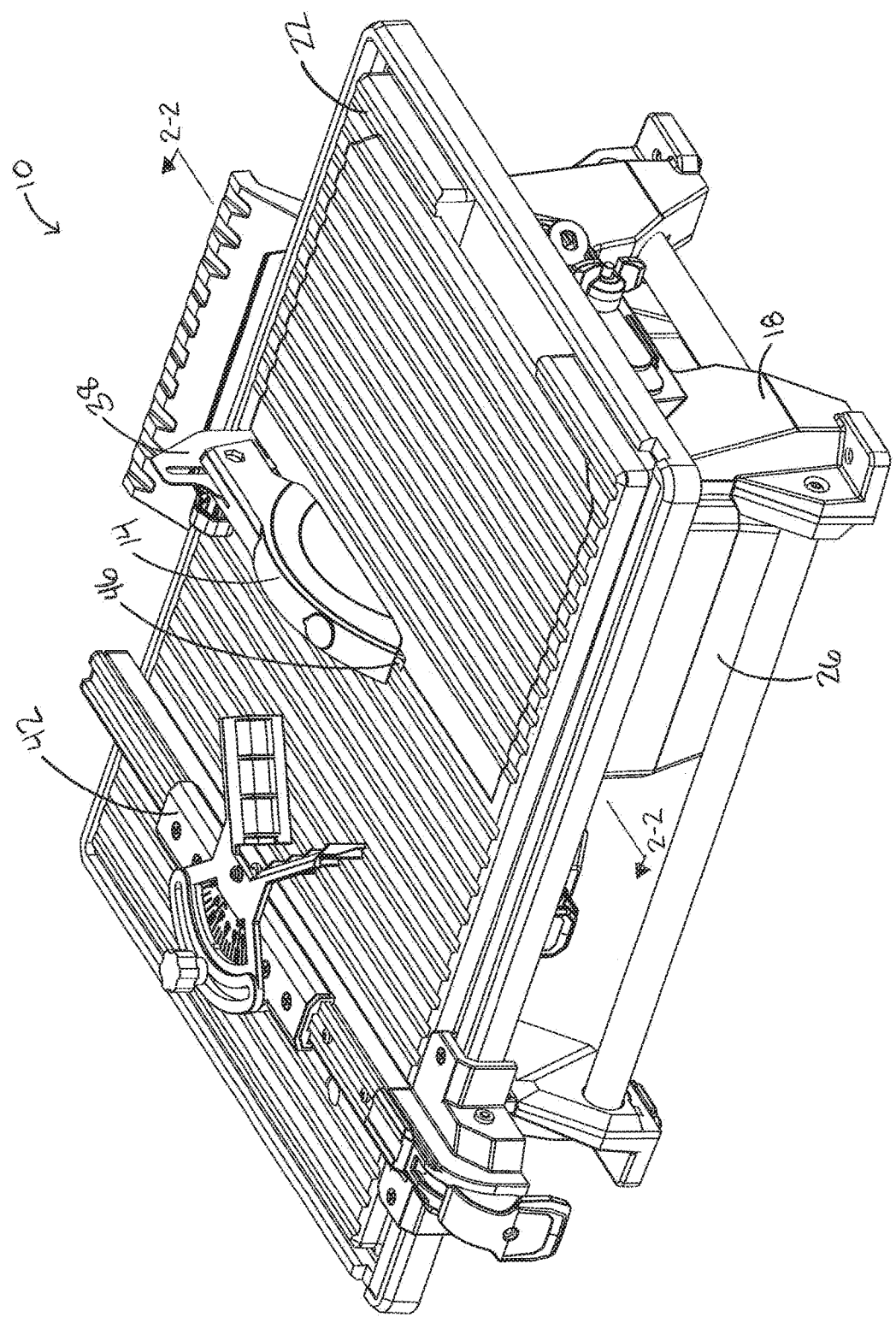
FIG. 1 is a perspective view of a tile saw in accordance with an embodiment of the invention.
Figure 2:
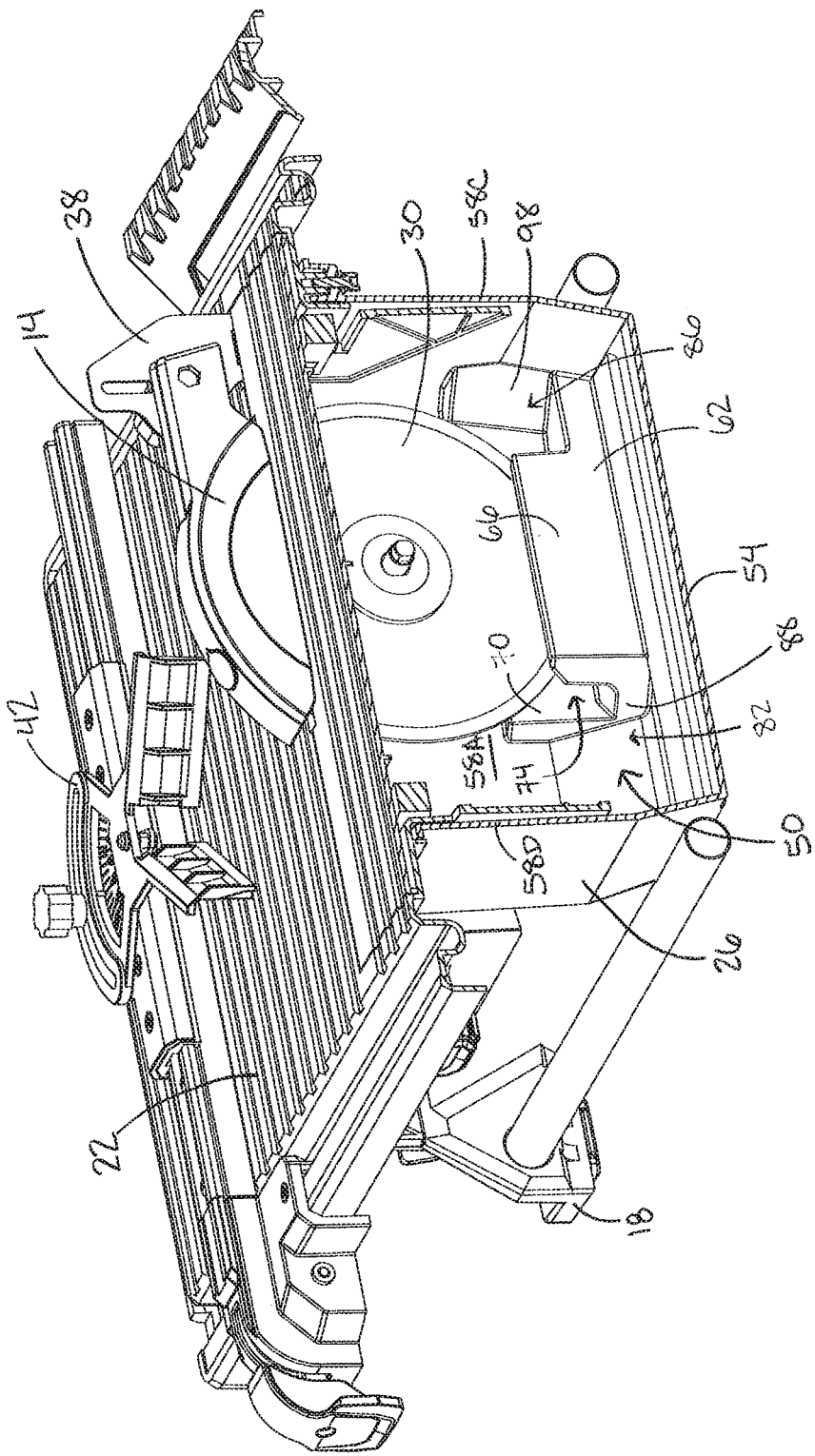
FIG. 2 is cross-sectional view of the tile saw of FIG. 1 taken along section line 2-2 in FIG. 1.

FIGS. 1 and 2 illustrate a tile saw 10 that can be used to accurately and quickly cut workpieces or construction materials such as ceramic, marble, or granite tiles and the like. The tile saw 10 includes a saw unit 14, a base 18, a table 22, and a pan 26. The saw unit 14 includes a saw blade 30 driven by a motor 34 (FIG. 3) and operable to cut the workpiece. The base 18 is a structural component that supports the table 22, the pan 26, and the saw unit 14 upon the ground or another support surface. In the illustrated embodiment shown in FIG. 1, the tile saw 10 includes a tile guide 42 that can be used to position the workpiece on the table 22 relative to the saw blade 30.

As shown in FIG. 2, the pan 26 is attached to the underside of the table 22. The pan 26 contains a quantity of fluid (not shown) such as water that cools the saw blade 30 and carries away debris removed during the cutting process. In the illustrated embodiment, the saw blade 30 protrudes through a slot 46 (FIG. 1) in the table 22 and extends into the pan 26 where the saw blade 30 is cleaned and cooled by the fluid. When too much fluid is added to the pan 26, the rotating saw blade 30 will splash the user and send dirty water to the surrounding environment. When too little fluid is added to the pan 26, the saw blade 30 will not be sufficiently cooled and cleaned. In addition, the user will have to frequently add clean water to the pan 26. The pan 26 illustrated and described herein helps to balance these competing interests.

Figure 3:
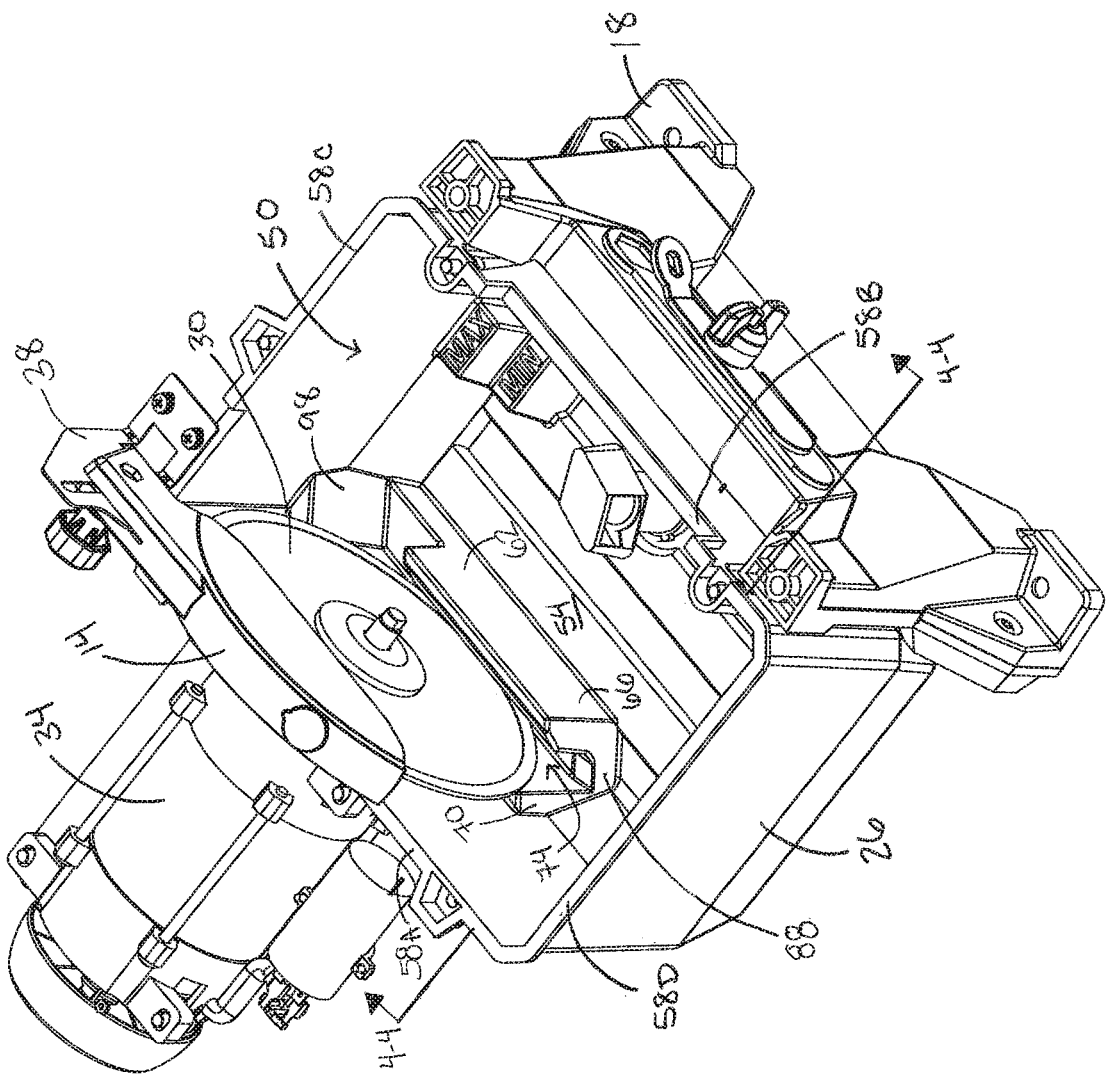
FIG. 3 is a partial perspective view of the tile saw of FIG. 1 with the table removed to reveal a pan.

With reference to FIGS. 2 and 3, the pan 26 includes an interior cavity 50 for holding the fluid. The interior cavity 50 is defined by a floor 54 and multiple side walls 58 extending upward from the floor 54. The side walls 58 form the perimeter of the interior cavity 50. In the illustrated embodiment, the pan 26 is generally rectangular shaped and includes the floor 54 and four side walls 58 forming the perimeter of the interior cavity 50. Specifically, the pan 26 includes a first side wall 58A and a second side wall 58B that are oriented parallel to one another. A third side wall 58C and a forth side wall 58D are oriented parallel to one another and are arranged perpendicular to the first side wall 58A and the second side wall 58B. In other embodiments, the number and orientation of the walls 58 can vary.

With continued reference to FIGS. 2 and 3, the tile saw 10 includes a flow control assembly 62 positioned within the pan 26. The flow control assembly 62 helps to control the flow of fluid around the saw blade 30. In the illustrated embodiment, the flow control assembly 62 and the pan 26 are formed as a single integral component. In other embodiments, the flow control assembly 62 is a separate component that can be inserted or attached to the pan 26.

The flow control assembly 62 includes a first interior wall 66 and a second interior wall 70 extending upward from the floor 54 of the pan 26. In the illustrated embodiment, the first interior wall 66 and the second interior wall 70 are parallel to one another. The first interior wall 66 and the second interior wall 70 are spaced apart from one another to define a channel 74 extending along a longitudinal axis 78 (FIG. 5). The saw blade 30 extends into the channel 74 in a direction parallel to the longitudinal axis 78 of the channel 74. In other words, the axis of rotation of the saw blade 30 is perpendicular to the longitudinal axis 78. The first interior wall 66 and the second interior wall 70 are configured to direct the flow of fluid through the channel 74 in a first direction parallel to the longitudinal axis 78. In the illustrated embodiment, the channel 74 does not extend across the full length of the pan 26. Rather, the channel 74 extends between a first open end 82 and a second open end 86. In other words, the first interior wall 66 and the second interior wall 70 have a length that is less than a length of the side walls 58A, 58B of the pan 26. Similarly, as shown in FIG. 4, the first interior wall 66 and the second interior wall 70 have a height that is less than the height of the side walls 58 of the pan 26.

Figure 4:
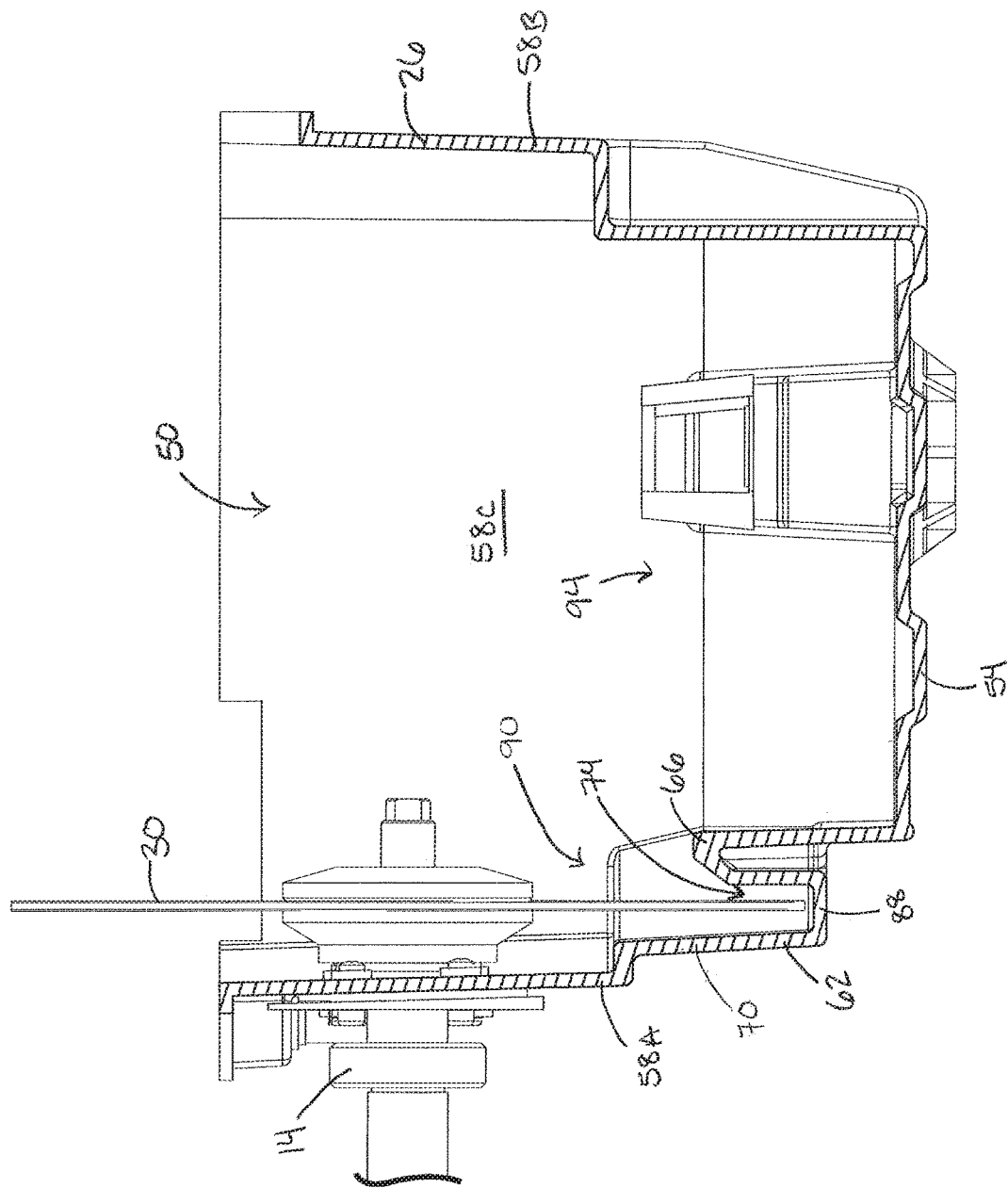
FIG. 4 is a cross-sectional view of the pan shown in FIG. 3 taken along section line 4-4 in FIG. 3.
Figure 5:
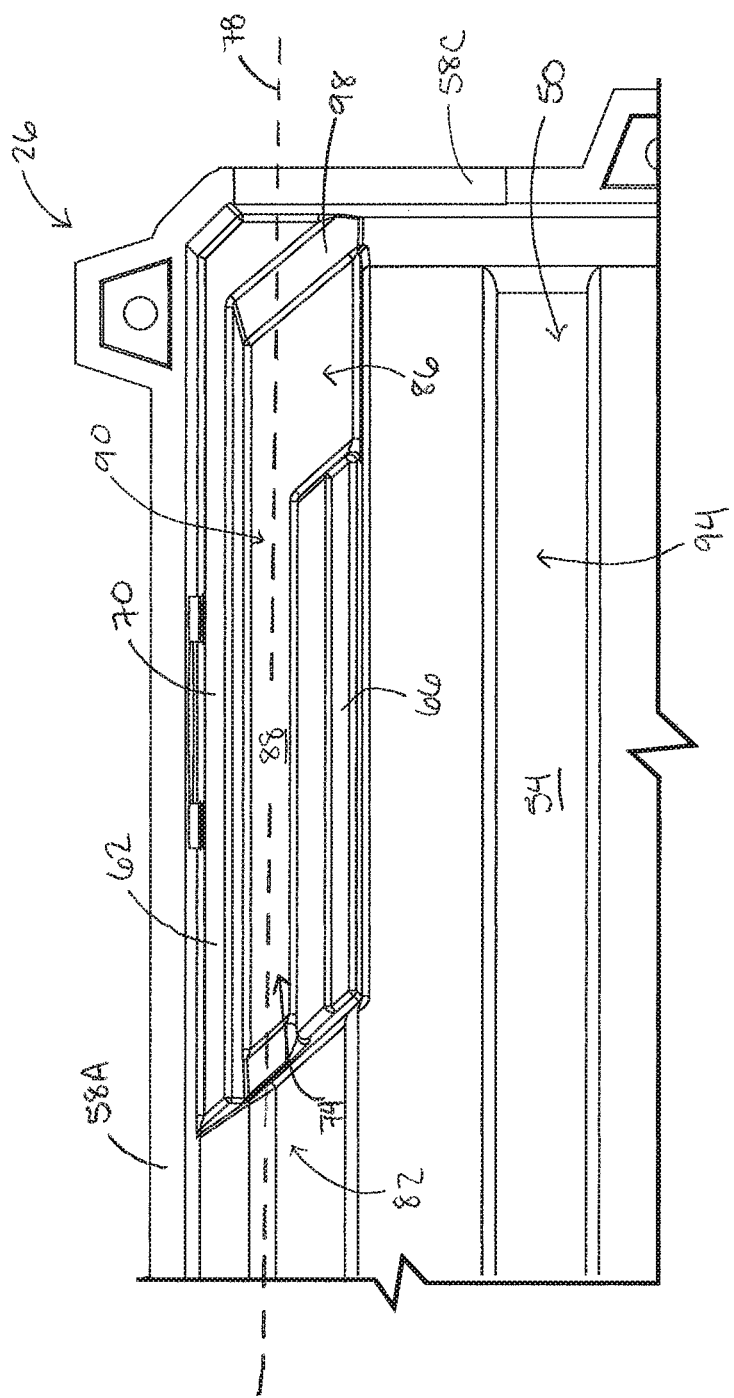
FIG. 5 is partial top view of the pan shown in FIG. 3 flow control assembly.

With reference to FIG. 4, the illustrated flow control assembly 62 further includes a bottom wall 88 extending between the first interior wall 66 and the second interior wall 70. The bottom wall 88 is elevated above the floor 54 of the pan 26 and partially forms the channel 74 through which the saw blade 30 rotates. As shown in FIG. 4, the first interior wall 66, the second interior wall 70, and the bottom wall 88 create a first section 90 of the interior cavity 50 of the pan 26. The remainder of the interior cavity 50 of the pan 26 defines a second section 94.

With reference to FIG. 5, the illustrated flow control assembly 62 includes a third interior wall 98 extending upward from the floor 54 of the pan 26. The third interior wall 98 is positioned adjacent the channel 74 and is obliquely oriented relative to the longitudinal axis 78 of the channel 74. Thus, the third interior wall 98 is oriented to redirect the flow of fluid in a second direction that is different than the flow of the fluid through the channel 74.

In operation, the bottom portion of the saw blade 30 extends within the channel 74 and generates a fluid current through the channel 74 flowing from the first open end 82 to the second open end 86. Between the interior walls 66, 70, the fluid flows in a first direction along the longitudinal axis 78 (FIG. 5). The obliquely oriented third interior wall 98 then redirects the fluid in a second direction away from the longitudinal axis 78 and into the second section 94 of the interior cavity 50. As the saw blade 30 rotates, the saw blade 30 pushes fluid out of the channel 74, reducing the fluid level within the channel 74 and increasing the fluid level outside the channel 74. Therefore, when the saw blade 30 is rotating, the level of the fluid within the first section 90 of the interior cavity 50 is lower than the level of the fluid in the second section 94 of the interior cavity 50. The level of fluid within the channel 74 is sufficiently high to cool and clean the saw blade 30, yet sufficiently low to reduce overspray and splashing onto the user. However, because the fluid level in the second section 94 surrounding the channel 74 can be higher, more water can be added to the pan 26 without causing overspray. This enables a user to have an appropriate water level surrounding the saw blade 30 during operation of the saw blade 30, while reducing the number of times the pan 26 must be refilled.

When the saw blade 30 stops rotating, the fluid can flow freely between the first section 90 and the second section 94 through the first open end 82 and the second open end 86 of the channel 74. This allows the fluid to settle such that the level of fluid within the first section 90 and the level of fluid within the second section 94 are equal. Accordingly, the flow control assembly 62 helps maintain an appropriate fluid level surrounding the saw blade 30 while in operation to reduce the problem of overspray, while also reducing the need to frequently add fluid to the pan 26.

Various features and advantages of the invention are set forth in the following claims.

What is claimed is:

1. A tile saw comprising:
   a saw unit including a motor and a saw blade driven by the motor;
   a table through which the saw blade at least partially protrudes;
   a pan positioned underneath the table and including a channel configured to receive at least a portion of the saw blade, the channel extending along a longitudinal axis perpendicular to a rotational axis of the saw blade such that fluid moves through the channel in a first direction in response to rotation of the saw blade, the channel including a channel wall extending parallel with the longitudinal axis; and
   an interior wall positioned adjacent the channel, the interior wall being obliquely oriented relative to the longitudinal axis and the channel wall of the channel to redirect the fluid in a second direction that is different from the first direction.

2. The tile saw of claim 1, wherein the channel wall is a first channel wall and the channel further includes a second channel wall both extending parallel with the longitudinal axis.

3. The tile saw of claim 2, wherein the interior wall and the first channel wall are formed as a single integral component.

4. The tile saw of claim 3, wherein the interior wall extends across the channel and overlaps with the second channel wall.

5. The tile saw of claim 2, further comprising a bottom wall extending between the first channel wall and the second channel wall, wherein the bottom wall is elevated above a floor of the pan.

6. The tile saw of claim 1, wherein a level of the fluid within the channel is lower than a level of the fluid outside the channel when the saw blade is rotating.

7. The tile saw of claim 6, wherein the level of the fluid within the channel is equal to the level of the fluid outside the channel when the saw blade is stationary.

8. The tile saw of claim 2, wherein the pan includes at least one side wall extending perpendicular relative to the floor, and wherein the side wall has a first height and the first channel wall has a second height that is less than the first height.

9. The tile saw of claim 8, wherein the side wall has a first length and the first channel wall has a second length that is less than the first length.

10. The tile saw of claim 8, wherein at least one of the first channel wall or the second channel wall is integrally formed with the side wall.

11. A tile saw comprising:
    a saw unit including a motor and a saw blade driven by the motor;
    a table through which the saw blade at least partially protrudes;
    a pan positioned underneath the table and including an interior cavity configured to hold a fluid;

a first interior wall extending perpendicular to a rotational axis of the blade, the first interior wall at least partially defining a channel configured to receive at least a portion of the saw blade and extending parallel to a longitudinal axis of the channel; and a second interior wall extending from an end of the first interior wall, the second interior wall being obliquely oriented relative to the rotational axis of the blade and the first interior wall of the channel.

12. The tile saw of claim 11, wherein the first interior wall is configured to direct fluid moving through the channel in a first direction in response to rotation of the saw blade, and wherein the second interior wall is configured to redirect the fluid in a second direction that is different from the first direction.

13. The tile saw of claim 11, further comprising a third interior wall extending parallel with the first interior wall.

14. The tile saw of claim 13, wherein the pan includes a side wall having a first length, and wherein the third interior wall has a second length that is less than the first length.

15. The tile saw of claim 13, wherein the bottom wall extends between the first interior wall, the second interior wall, and the third interior wall.

16. The tile saw of claim 13, wherein the second interior wall extends across the channel and overlaps with the third interior wall.

17. The tile saw of claim 11, wherein a level of the fluid within the channel is lower than a level of the fluid outside the channel when the saw blade is rotating.

18. The tile saw of claim 17, wherein the level of the fluid within the channel is equal to the level of the fluid outside the channel when the saw blade is stationary.

19. The tile saw of claim 11, wherein the channel extends between a first open end and a second open end opposite the first open end, wherein the first open end and the second open end are both in fluid communication with the fluid in the pan.

20. The tile saw of claim 11, wherein the pan includes at least one side wall extending perpendicular relative to the floor, and wherein the first interior wall is integrally formed with the side wall.

* * * * *